(12) United States Patent
Sato

(10) Patent No.: US 12,109,803 B2
(45) Date of Patent: Oct. 8, 2024

(54) IMAGE FORMATION APPARATUS

(71) Applicant: Oki Electric Industry Co., Ltd., Tokyo (JP)

(72) Inventor: Kimitoshi Sato, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 18/047,275

(22) Filed: Oct. 18, 2022

(65) Prior Publication Data

US 2023/0158815 A1 May 25, 2023

(30) Foreign Application Priority Data

Nov. 25, 2021 (JP) ................. 2021-191563

(51) Int. Cl.
*B41J 13/00* (2006.01)
*B41J 3/407* (2006.01)
*B41J 11/66* (2006.01)
*B41J 13/10* (2006.01)
*B41J 29/387* (2006.01)

(52) U.S. Cl.
CPC ........... *B41J 11/663* (2013.01); *B41J 3/4075* (2013.01); *B41J 13/106* (2013.01); *B41J 29/387* (2013.01)

(58) Field of Classification Search
CPC ......... B41J 11/663; B41J 11/70; B41J 11/703; B41J 13/106; B41J 15/04; B41J 29/387; B41J 3/4075; Y10D 10/00
See application file for complete search history.

(56) References Cited

FOREIGN PATENT DOCUMENTS

| JP | H06-178041 A | | 6/1994 |
|---|---|---|---|
| JP | 2005-084307 | * | 3/2005 |
| JP | 2021-062500 | * | 4/2021 |
| JP | 2021-117260 | * | 8/2021 |

* cited by examiner

*Primary Examiner* — Christopher E Mahoney
*Assistant Examiner* — Marissa Ferguson-Samreth
(74) *Attorney, Agent, or Firm* — METROLEX IP LAW GROUP, PLLC; Robert L. Scott, Esq.

(57) ABSTRACT

An image formation apparatus according to an embodiment may include: a discharge unit configured to transport printed media from a discharge port to an outside; and a controller configured to cause the discharge unit (i) to perform a holding operation to hold a part of a first group of printed media corresponding to a first print pause sheet number set in a setting unit at the discharge port by the discharge unit, and (ii) when the part of the first group of printed media is removed from the discharge port, to transport a second group of printed media corresponding to a second print pause sheet number set in the setting unit from the discharge port toward the outside and to perform the holding operation to hold a part of the second group of the printed media with being exposed to the outside from the discharge port.

15 Claims, 7 Drawing Sheets

IMAGE FORMATION APPARATUS

CROSS REFERENCE TO RELATED APPLICATIONS

This application claims priority based on 35 USC 119 from prior Japanese Patent Application No. 2021-191563 filed on Nov. 25, 2021, entitled "IMAGE FORMATION APPARATUS", the entire contents of which are incorporated herein by reference.

BACKGROUND

The disclosure may relate to an image formation apparatus such as a label printer.

In a related art, there is an image formation apparatus that is configured, after outputting a first sheet of a print job, to accept an instruction from a user whether or not to output the remaining sheets of the print job (see, for example, Patent Document 1).

Patent Document 1: Japanese Patent Application Publication No. H6-178041

SUMMARY

However, when printing multiple pages, the image formation apparatus cannot stop printing at an arbitrary page. It may be more convenient if printing could be stopped at an arbitrary page.

An object of an embodiment of the disclosure may be to provide an image formation apparatus capable of improving convenience.

An aspect of the disclosure may be an image formation apparatus that may include: an image formation unit configured to print images on media based on a print job having plural pages; a setting unit configured to set a number of sheets corresponding to one or more pages of the plural pages as a print pause sheet number, which is the number of sheets to be printed before a print pause; a discharge unit configured to transport a group of printed media according to the print pause sheet number set in the setting unit from a discharge port toward an outside and perform a holding operation to hold a part of the group of printed media with being exposed to the outside from the discharge port; and a controller configured to control the discharge unit to perform the holding operation, wherein the controller is configured to cause the discharge unit (i) to perform the holding operation to hold a part of a first group of printed media corresponding to a first print pause sheet number, and (ii) when it is determined that the part of the first group of printed media that is held by the holding operation of the discharge unit is removed from the discharge port, to transport a second group of printed media corresponding to a second print pause sheet number from the discharge port toward the outside and to perform the holding operation to hold a part of the second group of the printed media with being exposed to the outside from the discharge port.

According to the aspect, when printing plural pages, the printing can be paused at an arbitrary page (i.e., an arbitrary number of sheets) specified by the print pause sheet number(s). Also the printing can be resumed by removing the part of the media that is held with being exposed from the discharge port to the outside.

According to the disclosure, it may be possible to realize an image formation apparatus capable of improving convenience.

DETAILED DESCRIPTION

Figure 1:
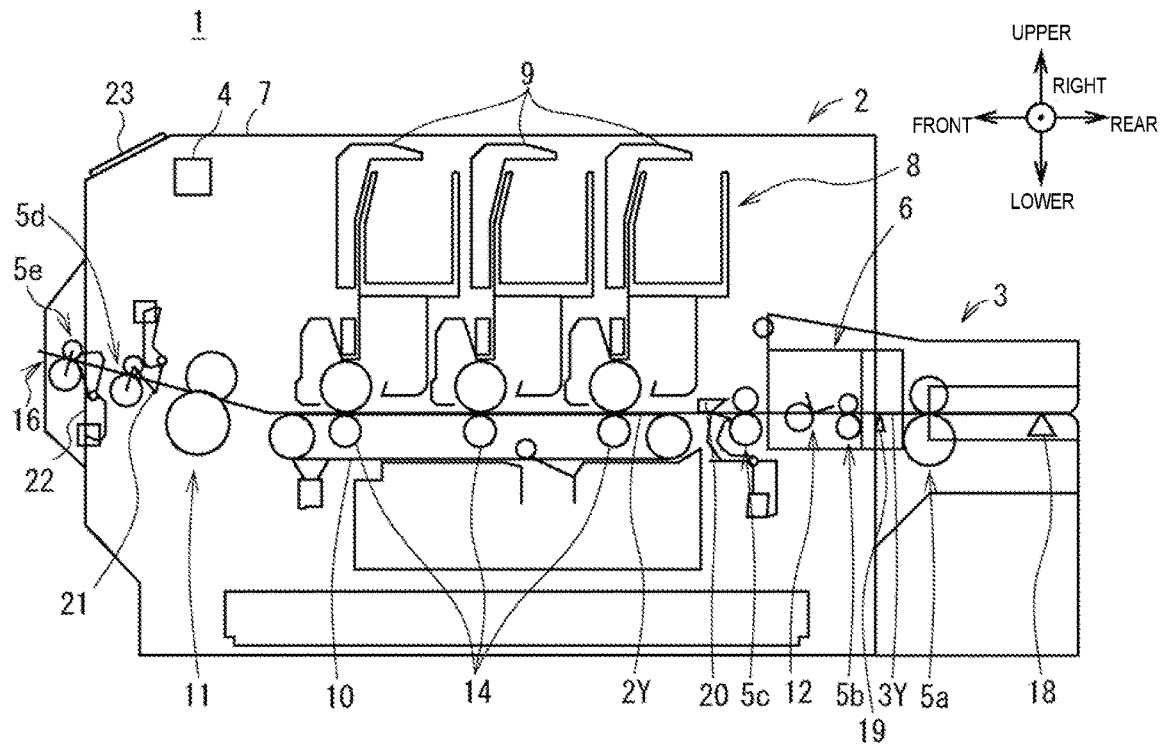
FIG. 1 is a diagram illustrating a view of an overall configuration of an image formation apparatus.

Descriptions are provided hereinbelow for one or more embodiments based on the drawings. In the respective drawings referenced herein, the same constituents are designated by the same reference numerals and duplicate explanation concerning the same constituents is omitted. All of the drawings are provided to illustrate the respective examples only.

1-1. Overall Configuration of Image Formation Apparatus

FIG. 1 illustrates an overall configuration of an image formation apparatus 1. The image formation apparatus 1 is configured as an electrophotographic printer and prints desired color images on a medium, such as an elongate continuous label sheet including a plurality of label sheets (a plurality of page sections). An overall of the image formation apparatus 1 is controlled by a controller 4. The controller 4 is composed mainly of a CPU (Central Processing Unit), and reads a predetermined program from a storage, such as a ROM (Read Only Memory) or flash memory, into a RAM (Random Access Memory), and executes the program so as to perform various kinds of processing by controlling components in the image formation apparatus. The image formation apparatus 1 is largely composed of a main unit 2 configured to perform printing processing, a transporting and cutting unit 3 that is installed on a right side of the main unit 2 in FIG. 1 and configured to transport and cut the elongate continuous label sheet, and a roll feeder unit (not illustrated) that is installed on a right side of the transporting and cutting unit 3 in FIG. 1 and configured to supply the continuous label sheet. In the following description, a direction toward the main unit 2 from the transporting and cutting section 3 in FIG. 1 is referred to as a front side of the image formation apparatus 1, a direction toward the transporting and cutting section 3 from the main unit 2 in FIG. 1 is referred to as a rear side of the image formation apparatus 1, a direction toward an upper surface side of the drawing sheet of FIG. 1 is referred to a right side of the image formation apparatus 1, and a direction toward a lower surface side of the drawing sheet of FIG. 1 is referred to as a left side of the image formation apparatus 1. Also, an upper side and a lower side with respect to the image formation apparatus 1 are defined in FIG. 1.

Figure 2:
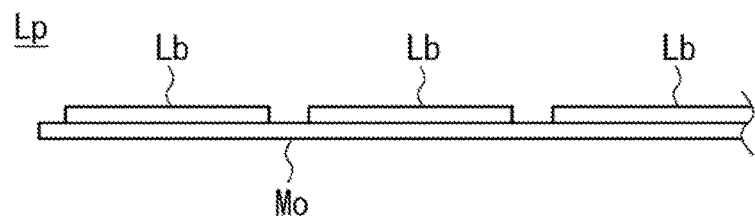
FIG. 2 is a diagram illustrating a view of a configuration of a continuous label sheet.

The continuous label sheet is rolled around a circumferential surface of a core material (not illustrated) extending in the left-right direction. At the time of printing, one end of the continuous label sheet is pulled out from the outermost circumference of the rolled continuous label sheet and transported along a transport path described below. Here, FIG. 2 illustrates a specific configuration of a continuous label sheet. The continuous label sheet includes a backing sheet Mo as a base layer and labels Lb as release layers provided on the backing sheet Mo at regular intervals along the transport direction of the continuous label sheet. The image formation apparatus 1 is configured to print color images on the labels Lb of the label sheet.

Returning to FIG. 1, the transporting and cutting section 3 includes a transport path 3Y extending along the front-back direction, and includes a feed roller pair 5a and a sheet cutting unit 6 (a sheet cutter unit or a sheet cutting device) arranged in that order from back to front along the transport path 3Y. The feed roller pair 5a includes two rollers sandwiching the transport path 3Y therebetween from above and below and is configured to, when each thereof is rotated, transport the continuous label sheet toward the front direction as the transport direction.

The sheet cutting unit 6 is a rotary type cutter unit that is configured to cut the continuous label sheet by means of a cutter 12 composed of a fixed blade and a rotary blade while transporting the continuous label sheet. The sheet cutting unit 6 also includes therein a resist roller pair 5b configured to transport the continuous label sheet and the like. The sheet cutting unit 6 is configured to cut the continuous label sheet into predetermined lengths along the transport direction, transport the cut label sheet along the transport path 3Y by the resist roller pair 5b to forward the cut label sheet into the main unit 2 so as to pass the cut label sheet to a transport roller pair 5c.

The main unit 2 includes a transport path 2Y along the front-back direction. The transport roller pair 5c includes two rollers sandwiching the transport path 2Y therebetween from above and below and is configured to, when each thereof is rotated, transport the cut label sheet toward the front direction as the transport direction. The main unit 2 includes an image formation section 8 located in an upper portion in a rectangular-shaped housing 7 of the main unit 2. In the image formation section 8, three image formation units 9 are arranged so as to be aligned along the front-back direction. The image formation units 9 are configured, under the control of the controller 4, to form toner images of predetermined colors and transfer the toner images to the paper being transported by a transport belt 10, respectively. The transport belt 10 is stretched by a plurality of belt rollers and is configured to run (rotate) to convey the cut label sheet forward along the transport path 2Y to a fixation device 11.

The fixation device 11 is configured to heat and rotate each of fusing rollers located on lower and upper sides of the transport path 2Y, respectively, to apply heat and pressure to the cut label sheet to fix the toner images, and conveys the printed label sheet (the cut label sheet having toner image fixed thereon) to a discharge roller pair 5d provided on a front side of the fixation device 11. The discharge roller pair 5d includes two rollers sandwiching the transport path 2Y therebetween from above and below and is configured to, when each thereof is rotated, transport the printed label sheet toward the front direction along the transport direction, and discharge the printed label sheet through a discharge port 16 to the outside.

A pair of clamping rollers 5e is provided slightly behind the discharge port 16 and includes two rollers arranged to sandwich the transport path 2Y therebetween from above and below. The clamping roller pair 5e is configured, under the control of the controller 4, to sandwich (hold) from above and below an upstream end portion (that is, a rear end portion) of the printed label sheet whose downstream side portion (that is, the front side portion) in the transport direction is exposed forward from the discharge port 16. That is, the clamping roller pair 5e can hold the printed label sheet so as not to drop the printed label sheet from the discharge port 16 in the state where the front portion of the printed label sheet is exposed to the outside from the discharge port 16. A mode in which the clamping roller pair 5e holds the printed label sheet with a part of the printed label sheet exposed to the outside from the discharge port 16 is called a presenter mode. Note that, upon discharging the label sheet, the clamping roller pair 5e and the discharge roller pair 5d are configured to transport the label sheet forward along the transport path 2Y and discharge the label sheet from the discharge port 16 to the outside.

In addition, a sheet end sensor 18, a feed sensor 19, a writing sensor 20, a discharge sensor 21, and a removal sensor 22 are provided inside of the image formation apparatus 1. The sheet end sensor 18, the feed sensor 19, the writing sensor 20, the discharge sensor 21 and the removal sensor 22 are paper detection sensors respectively to recognize (detect) the passage of the label sheet. These sensors 18, 19, 20, 21, and 22 are configured to mechanically operate as the label sheet passes therethrough and transmit the detection results to the controller 4. The controller 4 measures the detection timings of the label sheet by the sheet end sensor 18, the feed sensor 19, the writing sensor 20, the discharge sensor 21, and the removal sensor 22, and thereby detects delay of the transport of the label sheet, paper jams, and etc.

Furthermore, at a front side of the main unit housing 7 of the image formation apparatus 1, an operator panel 23 including a display and a button controller section is provided. The image formation apparatus 1 accepts various operations on the operator panel unit 23, displays the status of the image formation apparatus 1 on the operator panel unit 23, and displays screens for making various settings on the operator panel unit 23. The overall configuration of the image formation apparatus 1 is as described above.

The image formation apparatus 1 with the above configuration feeds the sheet detected by the sheet end sensor 18 to pass through the feed sensor 19 by the feed roller pair 5a and transports the sheet by the resist roller pair 5b and the transport roller pair 5c. The image formation apparatus 1 then transports the sheet by the transport belt 10, transfers the toner images formed by the image formation units 9 to the sheet by the transfer roller 14, and fixes the transferred toner images to the sheet by the fixation device 11. The image formation apparatus 1 also cuts the continuous label sheet into predetermined lengths with the cutter 12. Note that the image formation apparatus 1 can cut the continuous label sheet illustrated in FIG. 2 into sheets (stripes) each of which includes one label Lb or plural labels Lb (see FIGS. 9A and 9B). Furthermore, the image formation apparatus 1 stops the various rollers to stop the printed label sheet that has passed the discharge sensor 21 and has passed (ejected by) the discharge roller pair 5d before the upstream end portion of the printed label sheet in the transport direction passes the removal sensor 22 and thereby clamping the printed label sheet by the clamping roller pair 5e, and waits until the printed label sheet is removed by an operator (or a user). When the removal sensor 22 detects that the printed label sheet has been removed by the operator, the image formation apparatus 1 starts the next printing.

2. Functional Configuration of Image Formation Apparatus

Figure 3:
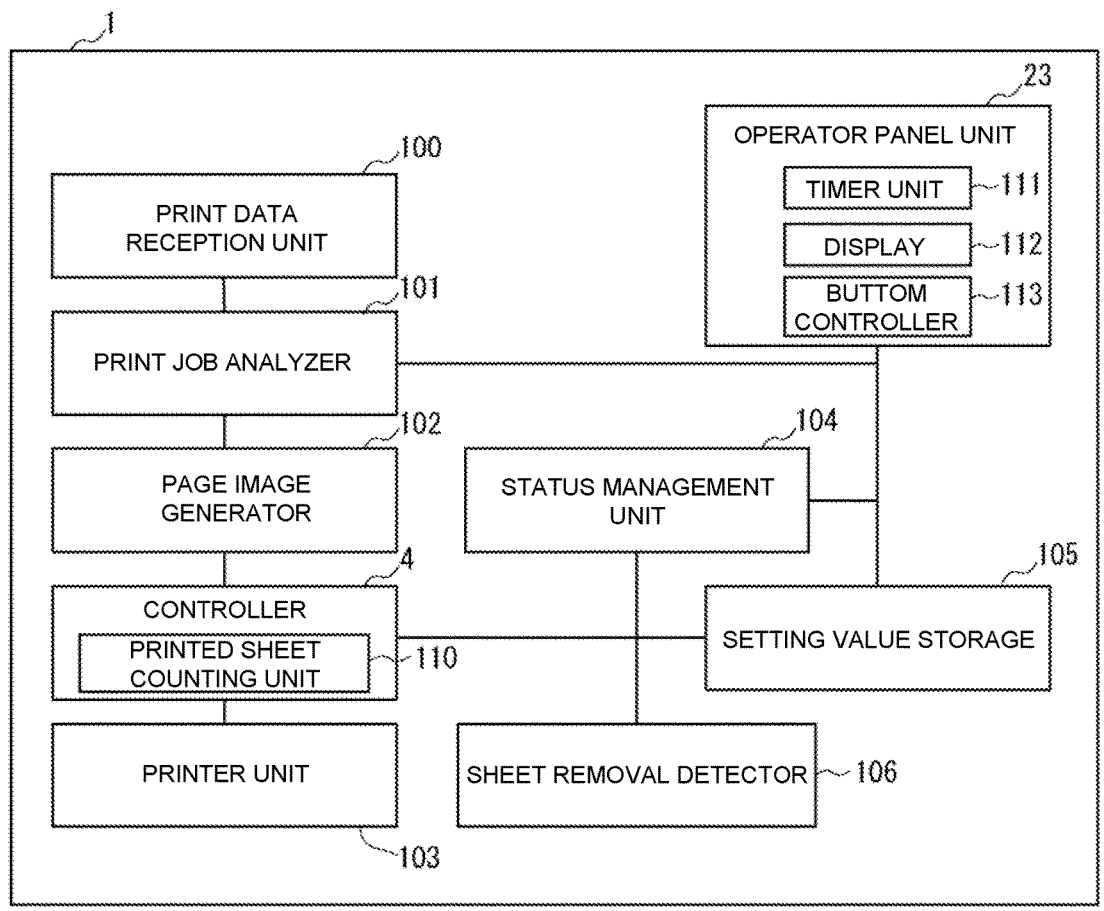
FIG. 3 is a block diagram illustrating a functional configuration of the image formation apparatus.

FIG. 3 illustrates a functional configuration of the image formation apparatus 1. The image formation apparatus 1 includes the following functional components: a print data reception unit 100, a print job analyzer 101, a page image generator 102, a controller 4 (control section 4), a printer unit 103 (a print device), the operator panel unit 23, a status management unit 104, a setting value storage 105, and a sheet removal detector 106.

The print data reception unit 100 receives print data sent from an external device (or a host device) such as a mobile terminal, a personal computer, or the like. The print data reception unit 100 communicates with the external device connected via a wired LAN (Local Area Network) or a wireless LAN.

The print job analyzer 101 receives the print data received by the print data reception unit 100 and analyzes a print job contained in the print data based on the PJL (Printer Job Language). The PJL is a language that controls a print job and is used to transmit to the image formation apparatus 1 not only print settings that can be set for a single print job but also environment settings that can be set for multiple print jobs. Note that the print settings include, for example, setting value for color/monochrome, print quality, number of copies, etc. The environmental settings include a setting value for a print pause setting which indicates, for example, how many sheets (copies) to print before pausing the printing. When obtaining the environmental settings from the print data, the print job analyzer 101 stores the setting values of the environmental setting (e.g., the setting value of the print pause setting, or the like) in the setting value storage 105. The print pause setting included in the environmental settings can be set on the external device or the image formation apparatus 1. The method of setting on the image formation apparatus 1 is described below. The print pause settings set in the image formation apparatus 1 are also stored in the setting value storage 105.

The print job analyzer 101 also extracts page data in the print job and sends the page data to the page image generator 102. In addition, the print job analyzer 101 sends the start and the end of the print job to the page image generator 102.

The page image generator 102 analyzes the page data received from the print job analyzer 101 based on the Printer Job Language (PJL) to perform drawing process, so as to generate page images. The page image generator 102 sequentially transmits the generated page images to the controller 4. Also, the page image generator 102 transmits to the controller 4 the start and the end of the print job as auxiliary information of the page images.

The controller 4 stores the page images received from the page image generator 102 in the RAM and sequentially transmits the page images to the printer unit 103. The controller 4 receives the start and end of the print job as auxiliary information of the page images and thereby determines the start and the end of the print job. Furthermore, the controller 4 includes a printed sheet counter 110, and the printed sheet counter 110 is configured to count the number of sheets of page images passed to the printer unit 103 (i.e., the number of printed pages).

In the case where the print pause settings are stored in the setting value storage 105, the controller 4 acquires the print pause settings and executes the print pause according to the setting value of the acquired print pause setting. As described below, the controller 4 executes the print pause when a print pause function is enabled (permitted). When the controller 4 executes the print pause, the controller 4 notifies the status management unit 104 of a print pause status. Furthermore, upon receiving from the sheet removal detector 106 a notification that indicates the sheet removal detector 106 detects the removal of the printed label sheet exposed from the discharge port 16, the controller 4 notifies the status management unit 104 of a print resumption status.

The printer unit 103 (or a print device) includes rollers illustrated in FIG. 2, the sheet cutting unit 6, the image formation section 8, the fixation device 11, etc., and performs printing on the label sheet under the control of the controller 4. The printer unit 103 pauses the printing when the status managed by the status management unit 104 becomes the print pause status. Then, when the status managed by the status management unit 104 becomes the print resumption status, the printer unit 103 resumes the printing.

The status management unit 104 manages the status of the image formation apparatus 1. The sheet removal detector 106 includes the removal sensor 22 and detects by means of the removal sensor 22 removal of the printed label sheet that is held with being exposed from the discharge port 16 and notifies the controller 4 of the removal of the printed label sheet.

The operator panel unit 23 includes a timer unit 111, a display 112, and a button controller 113. The operator panel unit 23 is configured to obtain the print pause settings from the setting value storage 105 and store in the setting value storage 105 the print pause settings that are entered by operating the button controller 113 on the setup menu screens displayed on the display section 112. The operator panel unit 23 is configured to obtain the print pause status from the status management unit 104, and to display, upon obtaining the print pause status, the screen indicating that the printing is paused on the display 112. The operator panel unit 23 may have, for example, a touch panel instead of a combination of the display 112 and the button controller 113.

The timer unit 111 is used when a print pause time period is set in the print pause settings. Specifically, the operator panel unit 23 is configured to, when the status of the status management unit 104 becomes the print pause status, start counting (measuring the time) by means of the timer unit 111, and to, when the print pause time period elapses, notify the controller 4 that the print pause time period has elapsed. The functional configuration of the image formation apparatus 1 is as described above.

3. Screen Transitions of Setup Menu Screens for Setting Print Pause Settings

Figure 4:
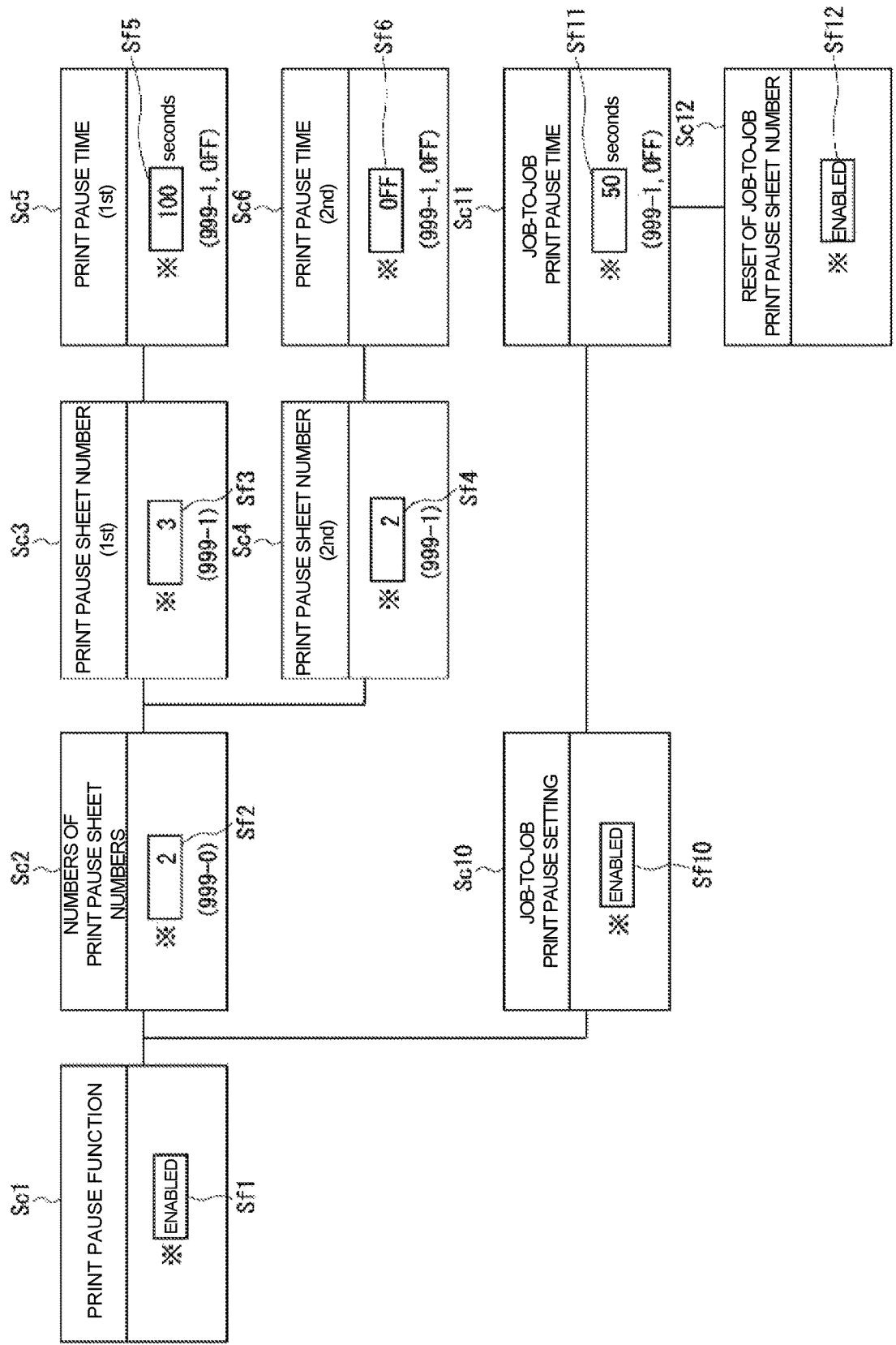
FIG. 4 is a diagram illustrating screen transitions of setup menu screens of the image formation apparatus.

Next, with reference to FIG. 4, screen transitions of setup menu screens displayed on the display 112 of the operator panel unit 23 for setting the print pause settings are described below. The setup menu screens have a hierarchical structure, and first displays a screen Sc1. The screen Sc1 is used to enable or disable the print pause function, and includes (displays) a setting field Sf1. By using the setting field Sf1, the operator can select whether to enable or disable the print pause function. Once the print pause function is enabled or disabled on the screen Sc1, the next options are a screen Sc2 and a screen Sc10. If the screen Sc2 is selected by the operator, the system transitions to the screen Sc2.

The screen Sc2 is a screen for setting the number of one or more print pause sheet numbers, and includes (displays)

a setting field Sf2. The print pause sheet number is a setting that indicates how many sheets are to be printed before pausing the printing (the number of sheets to be printed before pausing the printing). The print pause function of the image formation apparatus 1 allows the user to set one print pause sheet number or plural print pause sheet numbers. If two print pause sheet numbers are set, for example, if a first print pause sheet number is set to three (sheets) and a second print pause sheet number is set to two (sheets), the image formation apparatus pauses the printing after three sheets are printed, resumes the printing, pauses the printing after two sheets are printed, resumes the printing, pauses the printing after three sheets are printed, resumes the printing, pauses the printing after two sheets are printed, . . . and so on.

In addition, the print pause function allows the user to set, for each of the set print pause sheet numbers, a print pause time period which indicates a time period from a time when the printing is paused after the sheets corresponding to the print pause sheet number are printed to a time when the printing is automatically resumed. Note that the print pause sheet number can be set to zero, in which case no print pauses according to the set print pause sheet number are performed. The print pause time period can also be set to OFF, in which case the printing is not be automatically resumed.

The operator can set (specify) the number of settings of the print pause sheet numbers through the setting field Sf2 displayed on the screen Sc2. If the number of settings for the print pause sheet numbers is set to a value other than zero on the screen Sc2, the screen Sc2 transitions to a screen(s) for setting the print pause sheet number(s). In an example illustrated in FIG. 4, the number of the print pause sheet numbers is set to two, so the next options are a screen Sc3 for setting a first print pause sheet number and a screen Sc4 for setting a second print pause sheet number.

Through a setting field Sf3 displayed on the screen Sc3, the operator can set (specify) the first print pause sheet number (a first number of sheets to be printed before a print pause). When the first print pause sheet number is set on the screen Sc3, the screen Sc3 transitions to a screen Sc5 for setting a first print pause time period which is to be set (paired) with the first print pause sheet number.

Through a setting field Sf5 displayed on the screen Sc5, the operator can set (specify) the first print pause time period. When the first print pause time period is set on the screen Sc5, the screen Sc5 is shifted to, for example, a screen Sc4.

Through a setting field Sf4 displayed on the screen Sc4, the operator can set (specify) a second print pause sheet number (a second number of sheets to be printed before a print pause). When the second print pause sheet number is set on the screen Sc4, the screen Sc4 transitions to a screen Sc6 for setting a second print pause time period which is to be set (paired) with the second print pause sheet number.

Through a setting field Sf6 displayed on the screen Sc6, the operator can set (specify) a second print pause time period. If the second print pause time period is set on the screen Sc6, the screen Sc6 is shifted to, for example, a screen Sc10.

The screen Sc10 is a screen for setting a job-to-job print pause setting, and displays (includes) a setting field Sf10. The job-to-job print pause setting is a setting that indicates whether the printing is paused between print jobs (i.e., at the end of a print job) when multiple print jobs are received to print, regardless of the set print pause sheet number(s).

The operator can set (enable or disable) the job-to-job print pause setting through the setting field Sf10 displayed on the screen Sc10. If the job-to-job print pause setting is set on the screen Sc10 (specifically, if the job-to-job print pause setting is set to be enabled), the screen Sc10 transitions to a screen Sc11. For example, in a case where the job-to-job print pause setting is enabled and the number of remaining pages in the print job is one under the setting in which the print pause sheet number is three, the controller 4 performs the printing of the remaining one page and then pauses the printing at the time when the printing of the remaining one page is completed (that is, when the print job is finished). In this case, the label sheet having one label with the last page of the print job printed is held with being partially exposed to the outside through the discharge port 16.

The screen Sc11 is a screen for setting a print pause time period for a print pause between print jobs (a print pause time for the job-to-job print pause), and displays (includes) a setting field Sf11. Through the setting field Sf11 displayed on the screen Sc11, the operator can set (specify) the print pause time period for the job-to-job print pause. When the print pause time for the job-to-job print pause is set on the screen Sc11, the screen transitions to a screen Sc12.

The screen Sc12 is a screen for setting whether or not to reset (clear) the counter for the print pause sheet number when the print pause is performed between print jobs. In a case where the setting of resetting (clearing) the counter for the print pause sheet number is enabled, at a time when the printing is resumed after the print pause between print jobs (i.e., at the start of the next print job after the end of the print job), the counter for the first print pause sheet number starts to count from zero.

The operator can set (enable or disable) whether or not to reset (clear) the print pause sheet number when the print pause is performed between print jobs through a setting field Sf12 displayed on screen Sc12. In a case where the setting of whether or not to reset the print pause sheet number when the print pause is performed between print jobs is made on the screen Sc12, the screen Sc12 transitions to, for example, a higher level screen. The screen transitions of the setup menu screens are as described above.

Thus, through the setup menu screens (the screens Sc1 to Sc6, the screens Sc10 to Sc12) displayed on the display 112 of the operator panel unit 23, the image formation apparatus 1 allows the operator to set whether the print pause function is enabled or disabled, the print pause sheet number(s), the print pause time period(s), whether the job-to-job print pause is enabled or disabled, the print pause time period for the job-to-job print pause, and whether or not to reset the print pause sheet number when the print pause is performed between print jobs. The operator panel unit 23 stores the set values set on the setup menu screens in the set value storage 105 as the print pause settings described above.

In addition, the print pause settings can be set for the image formation apparatus 1 through, for example, a printer driver installed on the external device in the same or similar manner. The print pause settings set by the external device may be included in the print data received from the external device, and the print job analyzer 101 extracts the print pause settings from the print data and stores them in the setting value storage 105.

4. Operation of Image Formation Apparatus

Figure 5:
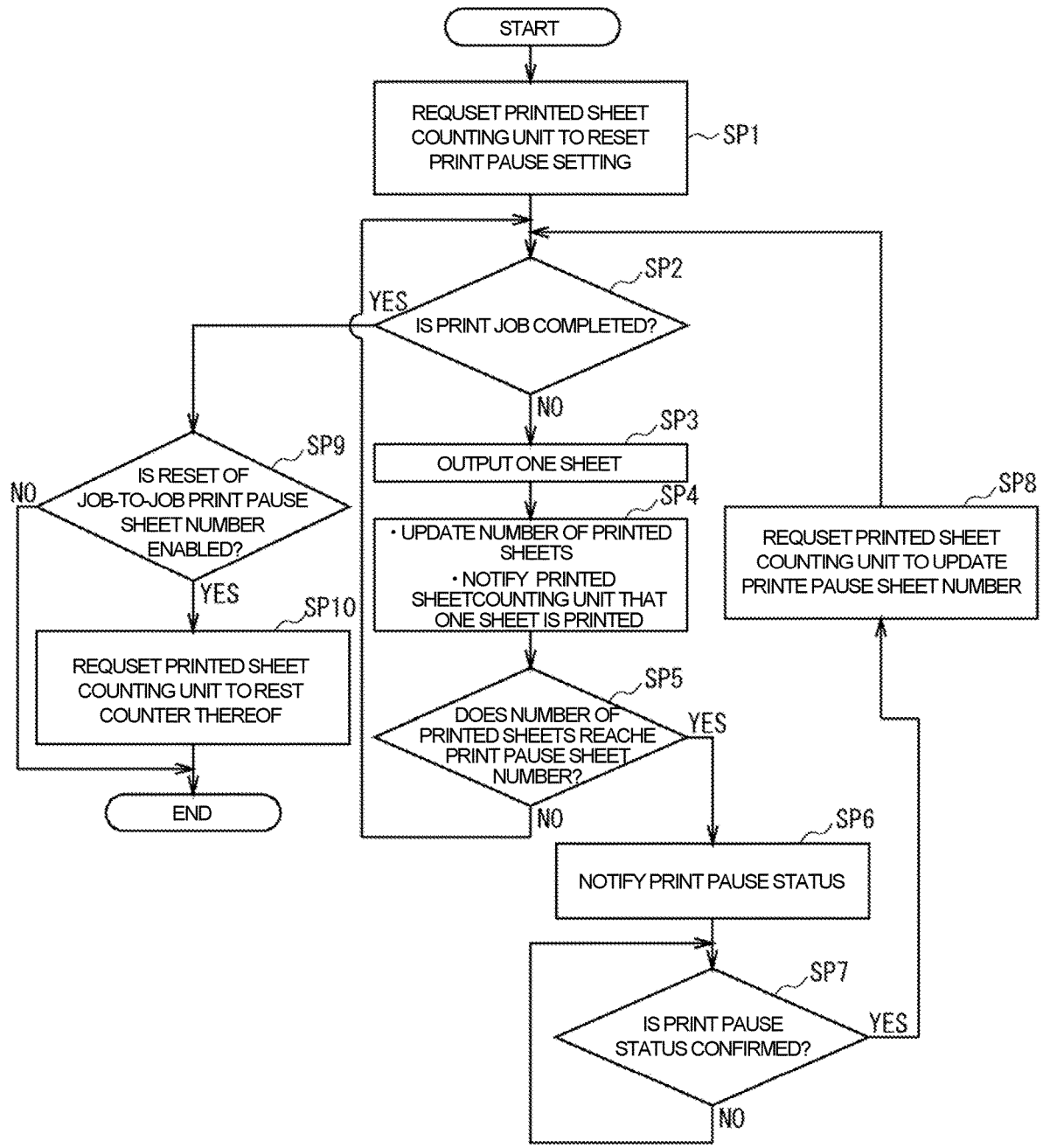
FIG. 5 is a flowchart illustrating a print operation of each print job by the image formation apparatus.
Figure 6:
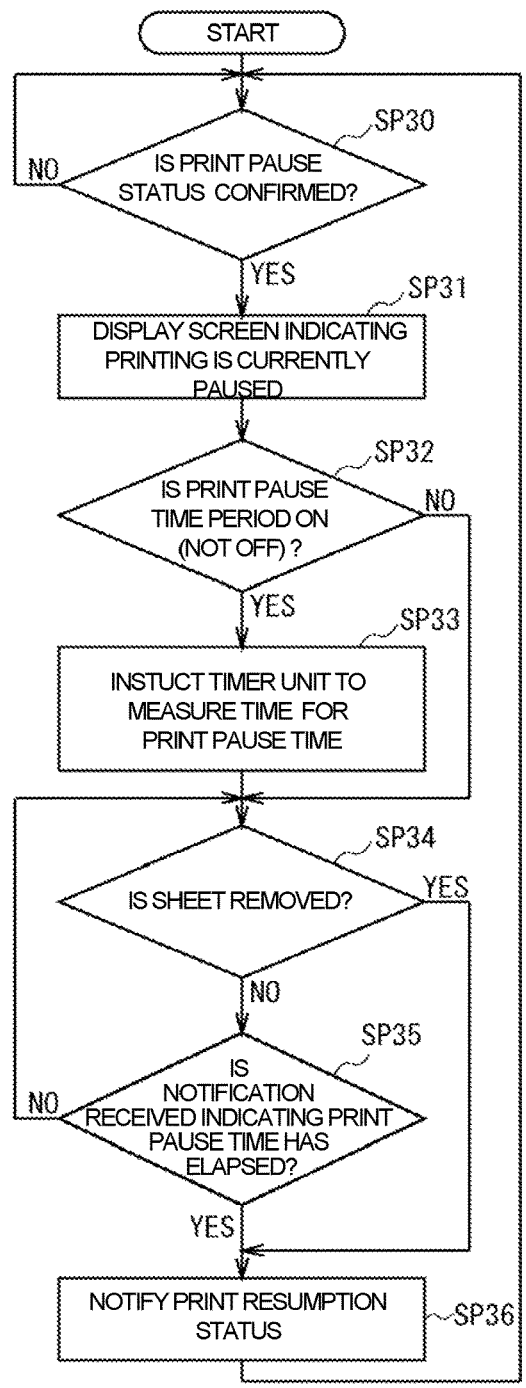
FIG. 6 is a flowchart illustrating an operation of the image formation apparatus from pausing of printing to resuming of the printing.

Next, an operation by the image formation apparatus 1 is described with reference to flowcharts illustrated in FIGS. 5 and 6. The operation illustrated in FIG. 5 is the printing operation for each print job, and the operation illustrated in FIG. 6 is the operation from the print pause to the print resumption.

First, the printing operation for each print job is described with reference to FIG. 5 below. The printing operation is performed primarily by the controller 4. In first step SP1, the controller 4 requests the printed sheet counting unit 110 to initialize the print pause settings. Here, if the printed sheet counting unit 110 has received a request to reset the print pause sheet number at the end of the previous print job, the printed sheet counting unit 110 sets the first print pause sheet number as a current print pause sheet number and initializes the printed sheet counter thereof to zero. Note that the step SP1 is skipped if the request to reset the print pause sheet number has not been received immediately before.

In next step SP2, the controller 4 determines whether the print job is finished or not. If the print job has been completed, the controller 4 obtains a positive result (YES) in step SP2 and proceeds to step SP9. In step SP9, the controller 4 refers to the print pause settings stored in the setting value storage 105 to determine whether or not the setting of resetting the print pause sheet number when the print pause is performed between print jobs is valid.

If the setting of resetting the print pause sheet number when the print pause is performed between print jobs is valid, the controller 4 obtains a positive result (YES) in step SP9 and proceeds to step SP10. In step SP10, the controller 4 requests the printed sheet counting unit 110 to reset the print pause sheet number. To the contrary, if the setting of resetting the print pause sheet number when the print pause is performed between print jobs is invalid, the controller 4 obtains a negative result (NO) in step SP9 and terminates the series of printing operations.

On the other hand, if it is determined in step SP2 that the print job has not been completed, the controller 4 obtains a negative result (NO) and proceeds to step SP3. In step SP3, the controller 4 passes the next page image of the page images received from the page image generator 102 to the printer unit 103. The printer unit 103 prints the page image received from the controller 4 on a label of a label sheet (one sheet) and outputs the printed label sheet.

In next step SP4, the controller 4 updates the number of sheets printed. Specifically, the controller 4 notifies the printed sheet counting unit 110 that one sheet (i.e., one page) has been printed. Upon receiving the notification, the printed sheet counting unit 110 increments (+1) the printed sheet counter (the number of printed sheets) managed by the printed sheet counting unit 110.

In next step SP5, the controller 4 determines whether the printed sheet counter of the printed sheet counting unit 110 has reached the print pause sheet number currently set. If the printed sheet counter (the number of printed sheets) has not been reached to the print pause sheet number, the controller 4 obtains a negative result (NO) in step SP5, and the process returns to step SP 2 to continue the operation from step SP2. To the contrary, if the printed sheet counter (the number of printed sheets) has been reached the print pause sheet number, the controller 4 obtains a positive result (YES) in step SP5 and proceeds to step SP 6.

In step SP6, the controller 4 notifies the status management unit 104 of the print pause status. The operator panel unit 23 monitors the status by periodically querying the status management unit 104 for the current status, and upon confirming that the status in the status management unit 104 has been changed to the print pause status, displays the screen indicating that the printing is being paused. In the case where the print pause time period is set, the operator panel unit 23 starts timing (counting the time) by means of the timer unit 111 from when the status in the status management unit 104 becomes the print pause status. If the print pause time period has elapsed before the status in the status management unit 104 becomes the print resumption status, the operator panel unit 23 notifies the controller 4 that the print pause time period has elapsed before the status in the status management unit 104 becomes the print resumption status.

In next step SP7, the controller 4 waits until the status in the status management unit 104 becomes the print resumption status, and when confirming that the status has been changed to the print resumption status, obtains a positive result (YES) in step SP7 and proceeds to step SP8. Note that the trigger to resume the printing includes: the elapse of the print pause time period during the print pause status; and the removal of the printed label sheet held with being exposed from the discharge port 16. The operation from the print pause to the print resumption will be described later in detail with reference to FIG. 6.

In step SP8, the controller 4 requests the printed sheet counting unit 110 to update the print pause sheet number. Upon receiving the request to update the print pause sheet number, the printed sheet counting unit 110 initializes the printed sheet counter (the number of printed sheets) to zero and updates the print pause sheet number. As mentioned above, plural print pause sheet numbers can be set. If only one print pause sheet number is set, the printed sheet counting unit 110 retains the current print pause sheet number even when receiving the request to update the print pause sheet number. To the contrary, if multiple print pause sheet numbers are set, the printed sheet counting unit 110 updates the current print pause sheet number to the next print pause sheet number upon receiving the request to update the print pause sheet number. In other words, in a case where the current print pause sheet number is the first print pause sheet number, the current print pause sheet number is updated to the second print pause sheet number. Further, in a case where the current print pause sheet number is the last one of the set print pause sheet numbers, the current print pause sheet number is updated (returns) to the first print pause sheet number.

After executing step SP8, the controller 4 returns to step SP2 to continue the operation from step SP2. The printing operation for each print job is described above.

Next, with reference to FIG. 6, the operation from the print pause to the print resume is described below. This operation is performed by the controller 4 and the operator panel unit 23 working together. In the image formation apparatus 1, the conditions for pausing the printing when the status of the status management unit 104 becomes the print pause status includes: a case (i) where the printed sheet counter in the printed sheet counting unit 110 reaches the print pause sheet number; and a case (ii) where a print job is completed in the state where the job-to-job print pause setting is enabled. Since the operation from the print pause to the print resumption is almost the same in both cases (i) and (ii), only the operation of the case (i) where the printed sheet counter in the printed sheet counting unit 110 reaches the print pause sheet number will be described below, for avoiding redundancies.

In first step SP30, the operator panel unit 23 waits until the status in the status management unit 104 becomes the print pause status, and when it is confirmed that the status management unit 104 become the print pause status, the operator panel unit 23 obtains a positive result (YES) in step SP30 and proceeds to step SP31.

Figure 7:
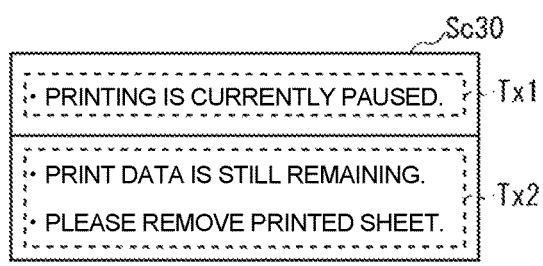
FIG. 7 is a diagram illustrating a screen displayed during pausing of the printing.

In step SP31, the operator panel unit 23 displays on the display 112 an indication indicating that the printing is paused. Specifically, the screen Sc30 illustrated in FIG. 7 is displayed on the display 112. The screen Sc30 displays a message Tx1 indicating that the printing is currently paused and a message Tx2 indicating that the print data is still remaining and prompting the operator to remove the printed label sheet that is held with being exposed from the discharge port 16 to the outside. By viewing the screen Sc30, the operator can understand that the image formation apparatus 1 is currently in the print pause and that the printing will be resumed by removing the currently held label sheet. Note that in a case where no print data remains, i.e., in a case where the currently held label sheet is the last page, the message Tx2 omits the part of the message that indicates the print data is still remaining.

In following step SP32, the operator panel unit 23 confirms whether the print pause time period is not OFF (whether the print pause time period is ON) by referring to the settings stored in the setting value storage 105. Note that since the print pause time period is set (paired) with the print pause sheet number as described above, if plural sets (pairs) of the print pause sheet numbers and the print pause time periods have been set, the operator panel unit 23 refers to one of the print pause time periods set (paired) with the current print pause sheet number.

Here, if it is determined that the print pause time period is not OFF (if the print pause time period is ON), the operator panel unit 23 obtains a positive result (YES) in step SP32 and proceeds to step SP33. In step SP33, the operator panel unit 23 notifies the timer unit 111 of the print pause time period and instructs the timer unit 111 to notify when the print pause time period elapses. In response to this instruction, the timer unit 111 starts timing (counting the time), and notifies, when the print pause time period has elapsed, the operator panel unit 23 of the fact that the print pause time period has elapsed. The notification is passed to from the operator panel unit 23 and then from the operator panel unit 23 to the controller 4. To the contrary, if it is determined that the print pause time period is OFF, the operator panel unit 23 skips step SP33 and proceeds to step SP34.

In step SP34, the controller 4 determines whether or not the controller 4 has received from the sheet removal detector 106 a notification that indicates the label sheet held with being exposed to the outside from the discharge port 16 has been removed. Here, if the controller 4 has not received such notification from the sheet removal detector 106, the controller 4 obtains a negative result (NO) in step SP34 and proceeds to step SP35.

In step SP35, the controller 4 determines whether the controller 4 has received from the operator panel unit 23 the notification that indicates the print pause time period has elapsed. If it is determined that such notification has not been received from the operator panel unit 23, the controller 4 obtains a negative result (NO) in step SP35 and returns to step SP34.

To the contrary, when it is determined that the controller 4 has received from the sheet removal detector 106 the notification that indicates the label sheet held with being exposed to the outside from the discharge port 16 has been removed, the controller 4 obtains a positive result (YES) in step SP34 and proceeds to step SP36. When it is determined that the controller 4 has received from the operator panel unit 23 the notification that indicates the print pause time period has elapsed, the controller 4 obtains a positive result (YES) in step SP35 and proceeds to step SP36.

If the positive result is obtained in either step SP34 or step SP35, it means that the condition for releasing the print pause and resuming the printing (either the fact that the label sheet has been removed or the fact that the print pause time period has elapsed) is satisfied. Therefore, in step SP36, the controller 4 notifies the print resumption status to the status management unit 104. As a result, the status in the status management unit 104 becomes the print resumption status, and the printer unit 103 resumes the printing accordingly. Note that when the printer unit 103 resumes the printing because the print pause time period has elapsed without removing the label sheet that is held with being exposed from the discharge port 16, the controller 4 is configured to cause the discharge unit to discharge the label sheet Lp that is held at the discharge port 16 from the discharge port 16 (that is, terminate the holding operation to hold the label sheet Lp by the clamping roller pair 5e so as to discharge the label sheet Lp that is held at the discharge port 16) and then cause the print unit 103 to resume the printing. The operation from the print pause to the print resumption is as described above.

Note that the operation when the print job is completed in the state where the job-to-job print pause setting is enabled is the same as the operation described above when the print count counter of the printed sheet counting unit 110 reaches the print pause sheet number, except that the print pause time period between print jobs is used in steps SP32, SP33, and SP36.

Figure 8:
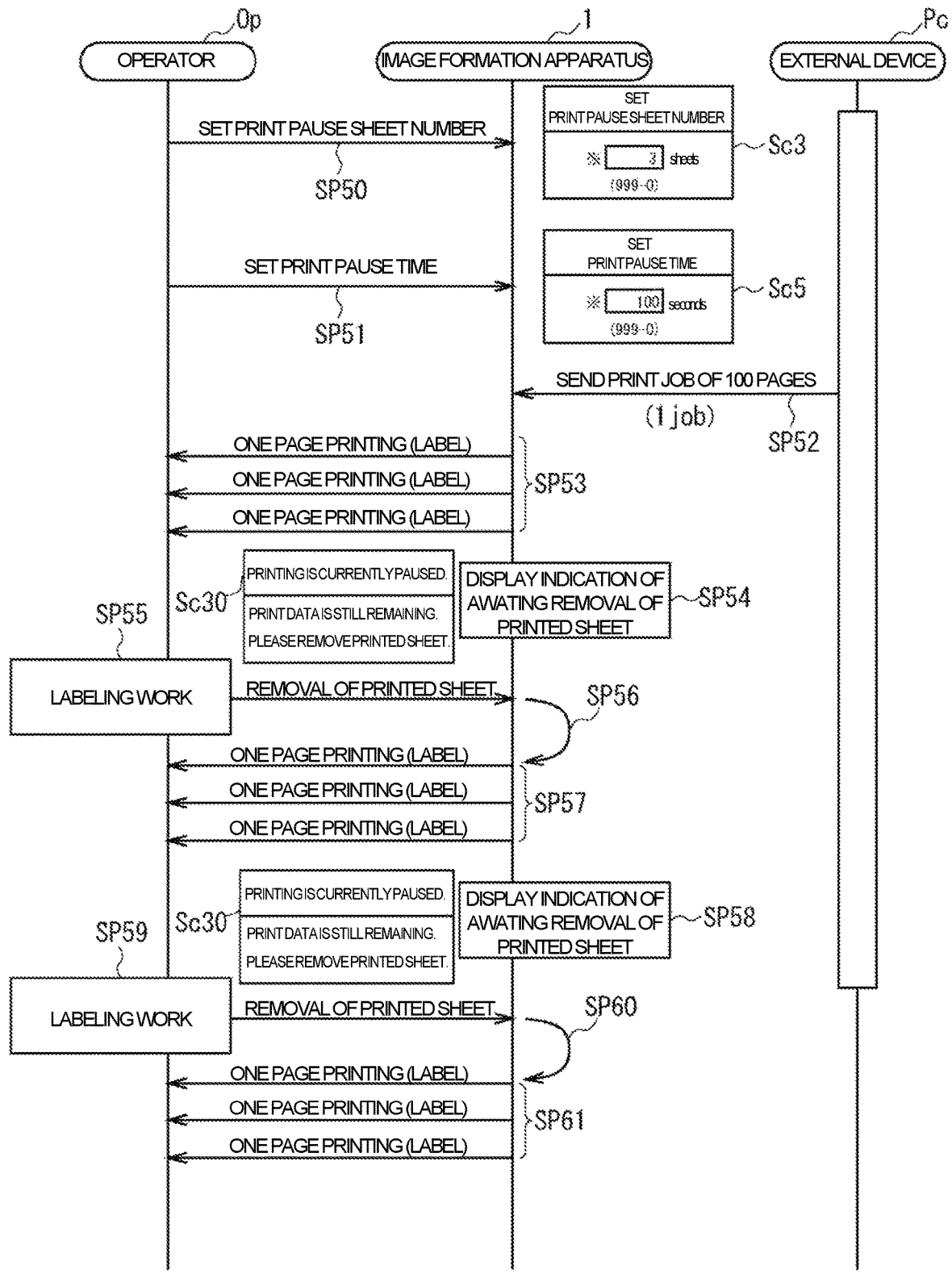
FIG. 8 is a diagram of a sequence chart illustrating a specific flow of printing.

Here, a specific example is given to briefly explain how printing is actually performed with reference to a sequence chart illustrated in FIG. 8. In first step SP50, the operator Op sets a print pause sheet number on the screen Sc3 displayed on the image formation apparatus 1. In next step SP52, the operator Op sets a print pause time period on the screen Sc5 displayed on the image formation apparatus 1. Here it is assumed that the print pause sheet number is set to three (sheets) and the print pause time period is set to 100 seconds.

In next step SP52, print data containing a print job for 100 pages is sent from an external device Pc to the image formation apparatus 1 and thus the print data is received by the image formation apparatus 1.

In next step SP53, the image formation apparatus 1 performs printing on three consecutive sheets (that is, three pages as a first group of media) which correspond to the set print pause sheet number (three), and then pauses the printing after printing the three consecutive sheets. At this time, as illustrated in FIG. 9A, the image formation apparatus 1 prints the first page image on the label Lb1 on a first label sheet Lp1 (a first page section Lp1), the second page image on the label Lb2 on a second label sheet Lp2 (a second page section Lp2), and the third page image on the label sheet Lb3 on a third label sheet Lp3 (a third page section Lp3) without cutting at boundaries between the first label sheet Lp1, the second label sheet Lp2, and the third label sheet Lp3, transports the label sheets in a connected state from the discharge port 16 (see FIG. 1) toward the outside, and then holds the connected label sheets at the discharge port 16 with the entirety of the first label sheet Lp1, the entirety of the second label sheet Lp2, and a part of the third label sheet Lp3 other than a rear end portion of the third label sheet being exposed to the outside through the discharge port 16.

At step SP54, the image formation apparatus 1 that has paused the printing displays the screen Sc30 indicating that the printing is currently paused. In step SP55, the operator removes the connected three label sheets Lp1 to Lp3 (the connected three page sections Lp1 to Lp3) from the image formation apparatus 1 before 100 seconds, which is set as the print pause time period, elapses, and then performs a labeling operation by peeling the labels Lb1 to Lb3 off from the removed label sheets Lp1 to Lp3 and attaching the labels Lb1 to Lb3 to desired locations.

In step SP56, if it is detected that the connected label sheets Lp1 to Lp3 have been removed, the image formation apparatus 1 resumes the printing to print the next three consecutive sheets (that is, the next three consecutive pages as a second group of media) in following step SP57, and then pauses the printing again.

Figure 9A:
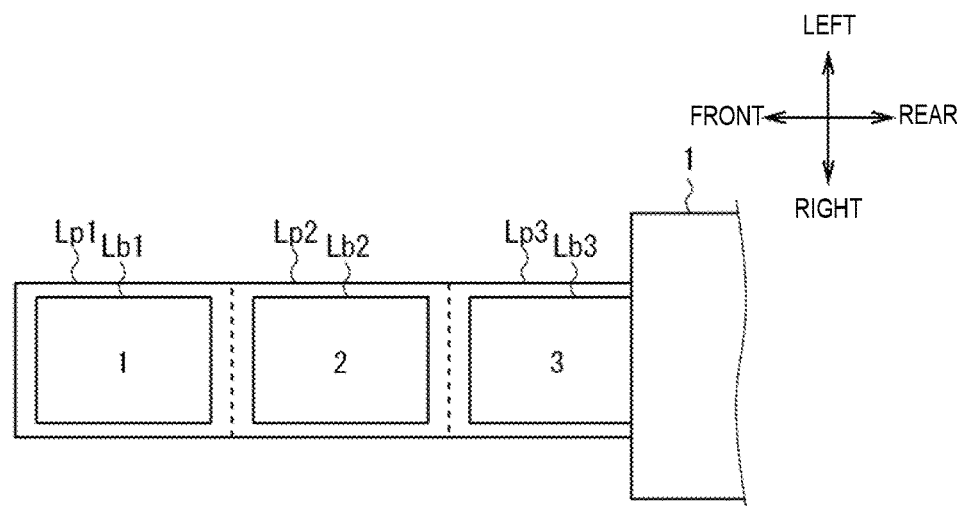
FIGS. 9A and 9B are diagrams illustrating how the continuous label sheet is cut.

Even in this case, as illustrated in FIG. 9A, the image formation apparatus 1 transports the printed first, second, and third label sheets Lp1, Lp2, and Lp3 with being connected to one another from the discharge port 16 toward the outside and holds a rear end portion (a tail end portion) of the third label sheet Lp3 of the connected first, second, and third label sheets Lp1, Lp2, and Lp3 with the other portion of the connected first, second, and third label sheets Lp1, Lp2, and Lp3 being exposed to the outside.

At step SP58, the image formation apparatus 1 that has paused the printing displays the screen Sc30 indicating that the printing is currently paused. To the contrary, in step SP59, the operator removes the connected three label sheets Lp1 to Lp3 from the image formation apparatus 1 before 100 seconds, which is set as the print pause time period, have elapsed, and then performs the labeling operation again In step SP60, if it is detected that the connected label sheets Lp1 to Lp3 have been removed, the image formation apparatus 1 resumes the printing to print the next three consecutive sheets (that is, the next three pages of label printing) in step SP61, and then pauses the printing. The image formation apparatus 1 repeats the processes described above until the image formation apparatus 1 completes the label printing of 100 pages. The specific flow of the printing operation is as described above.

5. Summary and Effects

As described above, in an embodiment described above, the image formation apparatus 1 includes: an image formation section 8 configured, based on a print job having plural pages, to print an image of each of the pages on a label sheet Lp as a medium; an operator panel unit 23 as a setting unit configured to set, as a print pause sheet number, the number of sheets corresponding to one or more of the plural pages; a pair of clamping rollers 5e serving as a discharge unit that is configured to transport a group of (a set of) printed label sheets Lp (e.g., three label sheets Lp1 to Lp3 illustrated in FIG. 9A) corresponding to the print pause sheet number (e.g., three) set at the operator panel 23 toward the outside from a discharge port 16 and perform an holding operation to hold a part of the group of label sheets Lp with being exposed to the outside from the discharge port 16 (e.g., hold the third label sheet Lp3 with being exposed to the outside), and a controller 4 that is configured to cause the clamping roller pair 5e to perform the holding operation.

The controller 4 is configured, when it is determined that a part of a first group of printed label sheets Lp corresponding to a first print pause sheet number that is held by the holding operation of the clamping roller pair 5e is removed from the discharge port 16, to cause the clamping roller pair 5e to transport a second group of printed label sheets Lp corresponding to a second print pause sheet number from the discharge port 16 toward the outside and perform the holding operation to hold a part of the second group of printed label sheets Lp with being exposed from the discharge port 16 to the outside.

Accordingly, when printing plural pages, the printing can be paused at any page specified by the first and second print pause sheet numbers. Also, the printing can be resumed by removing the label sheet Lp that is held with being exposed from the discharge port 16 to the outside. Thus, the image formation apparatus according to an embodiment described above can improve convenience compared to conventional technology.

In the image formation apparatus according to an embodiment described above, one or more of print pause sheet numbers can be set. When only one print pause sheet number is set, the second print pause sheet number described above will be the first print pause sheet number. To the contrary, for example, when two print pause sheet number are set as described above, the first print pause sheet number (e.g., the print pause sheet number for the first time) and the second print pause sheet number (e.g., the print pause sheet number for the second time) are set separately.

As described above, since the image formation apparatus is configured to allow to set one or more of print pause sheet numbers, the image formation apparatus can perform the printing with various combinations of print pause sheet numbers, for example, print two sheets, pause after the two sheets are printed, resume, print three sheets, pause after the three sheets are printed, resume, print one sheet, pause after the one sheet is printed, and so on. This is particularly effective, for example, when performing a labeling operation to attach two labels to a front surface of an object (a product or the like), three labels to a side surface(s) of the object, and one label to a rear surface of the object, or the like.

Furthermore, in the image formation apparatus 1 according to an embodiment, the controller 4 is configured, when a time set as a print pause time period as a holding operation continuation time (a holding operation duration time) elapses while a part of the group of the label sheets Lp is held at the discharge port 16 from the start of the holding operation by the clamping roller pair 5e, to terminate the holding operation by the clamping roller pair 5e and cause the clamping roller pair 5e to perform an discharging operation to discharge the part of the group of the printed label sheets Lp from the discharge port 16, and to cause the image formation section 8 to start printing on a next group of label sheets Lp. Thus, the image formation apparatus 1 can automatically discharge the label sheets Lp after the print pause time period has elapsed without the operator having to remove the held label sheets Lp. Also, the print pause time period can be set in consideration with an operator's work speed.

In addition, in the image formation apparatus 1 according to an embodiment described above, one or more print pause time periods can also be set as paired with one or more print pause sheet numbers. In other words, the first print pause time period (e.g., the print pause time period at the first time) which is set (paired) with the first print pause sheet number and the second print pause time period (e.g., the print pause time period at the second time) which is set (paired) with the second print pause sheet number can be set separately. This allows to pause the printing with various combination patterns of the print pause sheet numbers and the print pause time periods.

Furthermore, in the image formation apparatus 1 according to an embodiment described above, when outputting the number of the label sheets Lp set as the print pause sheet number, the sheet cutting unit 6 as a cutting unit does not cut into the label sheets Lp one by one but cuts into a unit of the print pause sheet number (that is, a unit of label sheet group including the number of label sheets Lp corresponding to the print pause sheet number). In other words, when the print pause sheet number is set to, for example, three, the image formation apparatus 1 transports the first label sheet Lp, the second label sheet Lp, and the third label sheet Lp in the connected state from the discharge port 16 toward the outside and then holds a part (the third label sheet Lp3) of the connected first, second, and third label sheets Lp with being exposed from the discharge port 16. This improves convenience when labeling work is performed for each group of plural labels, for example.

Furthermore, the image formation apparatus according to an embodiment described above, even while the printing is paused, the page image generator 102 generates page images for the next and subsequent pages and stores them in the RAM of the controller 4. Therefore, after the printing is resumed, the controller 4 can immediately start the image forming operation by the image formation section 8 using the page images stored in the RAM.

In addition, the image formation apparatus 1 according to an embodiment described above, the print pause settings such as the setting of the print pause sheet number and the like can be made either on the operator panel unit 23 provided in the image formation apparatus 1 or on the external device Pc such as a host device or the like. The print pause settings made on the external device Pc can be received along with the print data by the print data reception unit 100 serving as a reception unit. In this way, the image formation apparatus 1 according to an embodiment described above can achieve the effects described above in a variety of environments.

Furthermore, in the image formation apparatus 1 according to an embodiment described above, when the controller 4 is configured, when the job-to-job print pause setting is set to be enabled, to pause the printing between a first print job and a second print job (between plural print jobs) (i.e., in other words, at the end of the first print job), regardless of the set print pause sheet number. That is, upon printing multiple print jobs with the job-to-job print pause setting being enabled, if the number of sheets (e.g., 1 sheet) corresponding to the remaining pages in the first print job that have not yet been printed is less than the number of sheets (e.g., 3 sheets) corresponding to the first print pause sheet number, the controller 4 is configured to print on the number of sheets (e.g., 1 sheet) corresponding to the remaining pages in the first print job, transport them from the discharge port 5e to the outside and perform the holding operation by the clamping roller pair 5e to hold a part of them with being exposed from the discharge port 16 to the outside. In this way, the image formation apparatus 1 according to an embodiment can pause the printing between the first print job and the second print job regardless of the set print pause sheet number(s), while performing the print pauses according to the print pause sheet number(s).

6. Other Embodiments

6-1. Modification 1

In one or more embodiments described above, the case has been described in which, when the label sheet that is held with being partially exposed to the outside from the discharge port 16 is removed during the print pause, the image formation apparatus 1 terminates the print pause to resume the printing. The disclosure is not limited thereto. For example, the image formation apparatus 1 may release the print pause to resume the printing, when the operator panel unit 23 as an operation part is operated during the print pause. In this case, for example, the processing of the controller 4 in step SP34 illustrated in FIG. 6 is to be changed from the processing to determine whether or not the label sheet is removed to the processing to determine whether or not the operator panel unit 23 is operated. Note that such an operation to the operator panel unit 23 may be a predetermined operation such as, for example, an operation to a specific one or any one of the buttons of the button controller 113 of the operator panel unit 23.

Further, the conditions for releasing the print pause to resume the printing may include the operation to the button controller 113, in addition to the removal of the label sheet and the elapse of the print pause time period. Further, the image formation apparatus 1 may be configured such that each of these three conditions is set to be enabled or disabled.

6-2. Modification 2

Figure 9B:
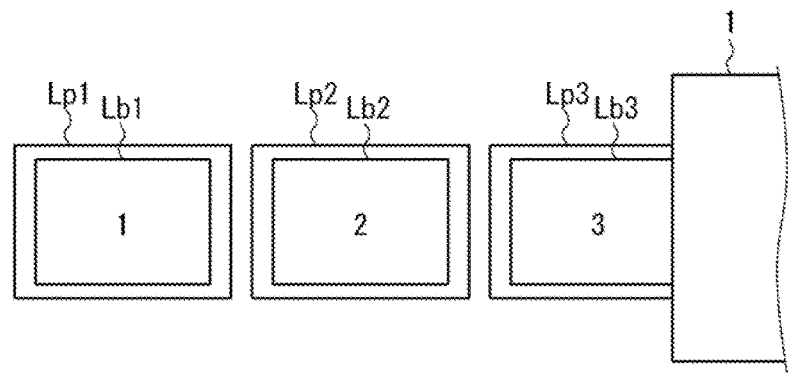

In one or more embodiments described above, the case has been described in which the continuous sheet composed of the plurality of label sheets Lp (page sections) connected is cut into units of multiple label sheets (page sections) corresponding the print pause sheet number, as illustrated in FIG. 9A. However, the disclosure is not limited thereto. For example, as illustrated in FIG. 9B, the continuous sheet composed of the plurality of label sheets Lp connected may be cut into units of a single sheet (i.e., units of a single page, and units of a single label Lb). In this case, at the holding operation, the tailmost one Lp3 in the group of the label sheets Lp1 to Lp3 corresponding to the print pause sheet number may be held with being exposed to the outside from the discharge port 16. Note that whether the continuous sheet is to be cut into units of the print pause sheet number or in units of a single sheet may be set through the setup menu screens as a print pause setting.

6-3. Modification 3

In one or more embodiments described above, the case has been described in which the print pause settings (the print pause sheet number(s), the print pause time period(s), etc.) are set before the image formation apparatus 1 receives the print data from the external device Pc, as illustrated in FIG. 8. However, the disclosure is not limited thereto and the print pause settings may be set at any time. For example, after the image formation apparatus 1 receives the print data from the external device Pc, the print pause settings may be set on the image formation apparatus 1 before starting the printing. Also, the print pause settings may be changed during the print pause in the image formation apparatus 1. In this case, the changed print pause settings may be applied after resuming the printing.

6-4. Modification 4

Furthermore, in one or more embodiments described above, the case has been described in which the sheet removal detector 106 detects, by means of the removal sensor 22 provided in the vicinity of the discharge port 16, the removal of the label sheet that is held by the clamping roller pair 5e with being exposed to the outside from the discharge port 16. The disclosure is not limited thereto, and other methods may be used to detect the removal of the label sheet. For example, a sensor that detects a nip pressure of the clamping roller pair 5e may be provided to detect, based on the detection result of the sensor, the removal of the label sheet. Since the nip pressure of the clamping roller pair 5e changes between the time when the label sheet has been clamped (held) by the clamping roller pair 5e and the time when the held label sheet has been removed, the nip pressure of the clamping roller pair 5e can be used to detect the removal of the label sheet.

Also, the disclosure is not limited thereto. For example, a sensor(s) that detect(s) one or both of the direction and the amount of rotation of one or both rollers of the clamping roller pair 5e may be provided, to detect, based on the detection result(s) of the sensor(s), the removal of the label sheet. When the label sheet is removed while the clamping roller pair 5e clamps (holds) the label sheet, the two rollers of the clamping roller pair 5e are pulled by the label sheet that so as to be rotated in the direction in which the label sheet is removed. Thus, the direction and the amount of rotation of one or both rollers of the clamping roller pair 5e can be used to detect the removal of the label sheet.

6-5. Modification 5

Further, in one or more embodiments described above, the case has been described in which the image formation apparatus 1 that is configured to print on the continuous sheet consisting of plural label sheets that are connected to one another; however, the disclosure is not limited thereto. For example, the disclosure may also be applied to an image formation apparatus configured to print on sheets (e.g., cut sheets) other than the label sheet(s). Further, in one or more embodiments described above, the case has been described in which the image formation apparatus 1 prints one page of page images on a single label, but the disclosure is not limited thereto. For example, multiple page images may be on a single label based on print settings.

Further, in one or more embodiments described above, the case has been described in which the sheet cutting unit 6 is provided upstream in the transport direction from the image formation section 8, but the disclosure is not limited thereto. For example, the sheet cutting unit 6 may be provided downstream in the transport direction of the image formation section 8. Further, in one or more embodiments described above, the case has been described in which the image formation apparatus 1 is the direct transfer type image formation apparatus, but the disclosure is not limited thereto. For example, the disclosure may be applied to image formation apparatuses of various types, such as an intermediate transfer type in which a toner image is primarily transferred to an intermediate transfer member (e.g., intermediate transfer belt) and then secondarily transferred from the intermediate transfer member to a sheet, or the like.

Further, in one or more embodiments described above, the case has been described in which the image formation apparatus 1 includes three image formation units 9. However, the disclosure is not limited thereto. For example, the disclosure may be applied to an image formation apparatus that includes two image formation units or four or more image formation units. Further, in one or more embodiments described above, the case has been described in which the image formation apparatus 1 is a photoelectronic printer. However, the disclosure is not limited to thereto. For example, the disclosure may be applied to another type of an image formation apparatus, such as an image formation apparatus included in multifunction peripheral.

6-6. Modification 6

Furthermore, the disclosure is not limited to one or more embodiments and modifications described above. That is, the application range of the disclosure covers embodiments obtained by arbitrarily combining some of or all of one or more embodiments and modifications described above.

The disclosure can be used for printers that can print multiple pages continuously.

The invention includes other embodiments or modifications in addition to one or more embodiments and modifications described above without departing from the spirit of the invention. The one or more embodiments and modifications described above are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. An image formation apparatus comprising:
an image formation unit configured to perform printing to print images on media based on a print job having plural pages;
a setting unit comprising an operator panel configured to receive an input of a number of sheets corresponding to one or more pages of the plural pages as a print pause sheet number, which is the number of sheets to be printed before a print pause;
a discharge unit comprising rollers configured to transport a group of printed media according to the print pause sheet number set in the setting unit from a discharge port toward an outside and perform a holding operation to hold a part of the group of printed media with being exposed to the outside from the discharge port; and
a controller configured to control the discharge unit to perform the holding operation, wherein
the controller is configured to cause the discharge unit (i) to perform the holding operation to hold a part of a first group of printed media corresponding to a first print pause sheet number set with the setting unit, and (ii) when it is determined that the part of the first group of printed media that is held by the holding operation of the discharge unit is removed from the discharge port, to transport a second group of printed media corresponding to a second print pause sheet number set with the setting unit, from the discharge port toward the outside and to perform the holding operation to hold a part of the second group of the printed media with being exposed to the outside from the discharge port.

2. The image formation apparatus according to claim 1, further comprising:
a cutting unit configured to cut a continuous sheet including a plurality of page sections as the media, wherein the cutting unit is configured to cut the continuous sheet into strips each of which includes multiple page sections corresponding to the set print pause sheet number, and the discharge unit is configured to transport each strip from the discharge port toward the outside and perform the holding operation to hold the strip at a tailmost one of the multiple page sections of the strip with the strip being exposed from the discharge port to the outside.

3. The image formation apparatus according to claim 1, further comprising:
a cutting unit configured to cut a continuous sheet including a plurality of page sections as the media, wherein the cutting unit is configured to cut the continuous sheet into units of a single one of the plurality of page sections, and the discharge unit is configured to transport the cut page sections corresponding to the set print pause sheet number one by one from the discharge port to the outside and perform the holding operation to hold a tailmost one of the cut page sections corresponding to the set print pause sheet number with being exposed from the discharge port to the outside.

4. The image formation apparatus according to claim 1, wherein
the first print pause sheet number and the second print pause sheet number are set separately.

5. The image formation apparatus according to claim 1, wherein
the second print pause sheet number is the same as the first print pause sheet number.

6. The image formation apparatus according to claim 1, wherein
the controller is configured, when a holding operation continuation time that is set elapses while the part of the group of media is held at the discharge port from a start of the holding operation, to resume the printing to terminate the holding operation.

7. The image formation apparatus according to claim 6, wherein
a first holding operation continuation time which is a duration of the holding operation in which the discharge unit holds the part of the first group of printed media corresponding to the first print pause sheet number and a second holding operation continuation time which is a duration of the holding operation in which the discharge unit holds the part of the second group of printed media corresponding to the second print pause sheet number are set separately.

8. The image formation apparatus according to claim 6, further comprising:
an operation unit, wherein
the controller is configured, when the holding operation continuation time elapses while the part of the group of media is held at the discharge port from the start of the holding operation or when a predetermined operation is performed on the operation unit during the holding operation, to resume the printing to terminate the holding operation and discharge the held part of the group of media from the discharge port.

9. The image formation apparatus according to claim 6, wherein
the operator panel is configured to display: a first sheet number setting part that prompts the user to set the first print pause sheet number; a first continuation time setting part that prompts the user to set a first holding operation continuation time; a second sheet number setting part that prompts the user to set the second print pause sheet number; and a second continuation time setting part that prompts the user to set a second holding operation continuation time.

10. The image formation apparatus according to claim 9, wherein
the first continuation time setting part is configured to accept an OFF setting in which no first holding operation continuation time is set and that causes the controller not to resume the printing due to the time elapse.

11. The image formation apparatus according to claim 9, wherein
the second continuation time setting part is configured to accept an OFF setting in which no second holding operation continuation time is set and that causes the controller not to resume the printing due to the time elapse.

12. The image formation apparatus according to claim 1, wherein
the media includes a base layer and a release layer provided on the base material layer.

13. The image formation apparatus according to claim 1, wherein
the controller is configured, upon printing a first print job and a second print job, to cause the discharge unit, when it is determined that the number of remaining pages included in the first print job that has not yet printed is less than the first print pause sheet number, to transport, after printing on the media corresponding to the number of the remaining pages, a group of the media corresponding to the number of the remaining pages from the discharge port toward the outside and to perform the holding operation to hold a part of the group of the media corresponding to the number of the remaining pages with being exposed to the outside from the discharge port.

14. The image formation apparatus according to claim 1, further comprising:
a reception unit configured to receive the print pause sheet number set by an external device.

15. The image formation apparatus according to claim 1, further comprising
a counter configured to count a value corresponding to a number of printed pages; and
a rest setting part configured to set whether to enable or disable a reset function to reset the counted value between consecutive print jobs, wherein
the controller is configured, when it is determined that the counted value reaches a value corresponding to the print pause sheet number set in the setting unit, to pause the printing, and
the controller is configured, when it is determined that a first print job in consecutive two print jobs is completed in a state where the reset function is enabled, to reset the counted value of the counter.

* * * * *